(12) United States Patent
Sherwood (10) Patent No.: US 6,507,282 B1
(45) Date of Patent: Jan. 14, 2003

(54) FILTER MONITORING SYSTEM USING A THERMISTOR

(75) Inventor: Robert A. Sherwood, El Paso, TX (US)

(73) Assignee: The Holmes Group, Inc., Milford, MA (US)

( * ) Notice: Subject to any disclaimer, the term of this patent is extended or adjusted under 35 U.S.C. 154(b) by 202 days.

(21) Appl. No.: 09/760,238

(22) Filed: Jan. 12, 2001

Related U.S. Application Data
(60) Provisional application No. 60/176,354, filed on Jan. 14, 2000.

(51) Int. Cl.[7] .............................................. G08B 21/00
(52) U.S. Cl. ........................ 340/607; 340/608; 55/307; 55/309; 55/311
(58) Field of Search ................................ 340/607, 608, 340/661, 655, 643, 584, 606; 55/307, 309, 311

(56) References Cited

U.S. PATENT DOCUMENTS

| | | |
|---|---|---|
| 2,920,457 A | 1/1960 | Bartlett, Jr. |
| 3,026,681 A | 3/1962 | Green |
| 3,630,039 A | 12/1971 | Hayashi |
| 3,653,375 A | 4/1972 | Raffel |
| 3,790,931 A | 2/1974 | Leveraus |
| 3,963,410 A | 6/1976 | Baysinger |
| 3,980,420 A | 9/1976 | Baysinger et al. |
| 3,989,486 A * | 11/1976 | Baysinger .................... 55/105 |
| 4,006,511 A | 2/1977 | Larsen |
| 4,034,911 A | 7/1977 | Baysinger et al. |
| 4,040,042 A | 8/1977 | Mayer |
| 4,050,291 A | 9/1977 | Nelson |
| 4,146,885 A | 3/1979 | Lawson, Jr. |
| 4,160,373 A | 7/1979 | Fastaia et al. |
| 4,240,072 A | 12/1980 | Fowler |
| 4,258,368 A | 3/1981 | Arnold et al. |
| 4,290,788 A | 9/1981 | Pittman et al. |
| 4,294,595 A | 10/1981 | Bowerman |
| 4,354,183 A | 10/1982 | Weeks et al. |
| 4,356,007 A | 10/1982 | Bowman |
| 4,357,936 A | 11/1982 | Ellestad et al. |
| 4,382,433 A | 5/1983 | Hess et al. |
| 4,407,134 A | 10/1983 | Snaper |
| 4,408,150 A | 10/1983 | Holston et al. |
| 4,415,896 A | 11/1983 | Allgood |
| 4,430,867 A | 2/1984 | Warner |
| 4,435,150 A | 3/1984 | Rippelmeyer |
| 4,828,016 A | 5/1989 | Brown et al. |
| 4,898,229 A | 2/1990 | Brown et al. |
| 5,014,908 A | 5/1991 | Cox |
| 5,022,460 A | 6/1991 | Brown |
| 5,058,197 A | 10/1991 | Honkomp et al. |
| 5,089,144 A | 2/1992 | Ozkahyaoglu et al. |
| 5,117,089 A | 5/1992 | Honkomp et al. |
| 5,127,464 A | 7/1992 | Butler et al. |

(List continued on next page.)

Primary Examiner—Julie Lieu
(74) Attorney, Agent, or Firm—Hoffmann & Baron, LLP (57) ABSTRACT

A system for monitoring a percentage of filter life remaining of a filter assembly of filter-fan devices. The system uses a single thermistor that is operated in two separate modes for monitoring the filter assembly. The thermistor is positioned in the airflow of the filter-fan adjacent to the air outlet. A first current is applied to the thermistor for determining the temperature of the airflow from a first thermistor voltage. The first thermistor voltage is responsive to the first current applied to the thermistor. A second current that is greater than the first current is applied to the heat the thermistor. The temperature of the thermistor is determined from a second thermistor voltage which is responsive to the second current applied to the thermistor. The percentage of filter life remaining of the filter assembly is determined from the temperature of the airflow and the second thermistor voltage.

13 Claims, 8 Drawing Sheets

U.S. PATENT DOCUMENTS

| | | |
|---|---|---|
| 5,131,932 A | 7/1992 | Glucksman |
| 5,138,120 A | 8/1992 | Adams |
| 5,141,309 A | 8/1992 | Wörwag |
| 5,205,126 A | 4/1993 | Schnurr et al. |
| 5,214,310 A | 5/1993 | Adams |
| 5,224,649 A | 7/1993 | Brown et al. |
| 5,251,813 A | 10/1993 | Kniepkamp |
| 5,325,312 A | 6/1994 | Kidd |
| 5,375,454 A | 12/1994 | Anderjasich et al. |
| 5,384,714 A | 1/1995 | Kidd |
| 5,429,649 A * | 7/1995 | Robin .................. 55/215 |
| 5,570,837 A | 11/1996 | Brown et al. |
| 5,666,949 A | 9/1997 | Debe et al. |
| 5,668,535 A | 9/1997 | Hendrix et al. |
| 5,688,308 A | 11/1997 | Voigts |
| 5,818,194 A | 10/1998 | Nordby |
| 5,856,740 A | 1/1999 | Rau et al. |
| 5,911,238 A | 6/1999 | Bump et al. |
| 5,984,663 A * | 11/1999 | Joyce .................. 431/76 |

\* cited by examiner

| TI = | Tlookup$_i$ = |
|---|---|
| 7.5 | 0d5h |
| 12.5 | 0a9h |
| 17.5 | 85h |
| 22.5 | 68h |
| 27.5 | 50h |
| 32.5 | 3dh |

FIG. 6 FAN ON LOW SPEED

FIG. 7  FAN ON MEDIUM SPEED $i.5 =$   $A(5, fm_i) =$   $A(10, fm_i) =$   $A(15, fl_i) =$   $A(20, fm_i) =$   $A(25, fm_i) =$   $A(30, fm_i) =$   $A(35, fm_i) =$

| i.5 | A(5,fm_i) | A(10,fm_i) | A(15,fl_i) | A(20,fm_i) | A(25,fm_i) | A(30,fm_i) | A(35,fm_i) |
|---|---|---|---|---|---|---|---|
| 5   | 0b4h | 0aeh | 96h  | 0a3h | 9eh  | 98h  | 92h  |
| 10  | 0b5h | 0b0h | 97h  | 0a5h | 9fh  | 9ah  | 94h  |
| 15  | 0b7h | 0b2h | 99h  | 0a7h | 0a1h | 9bh  | 96h  |
| 20  | 0b9h | 0b3h | 9ah  | 0a8h | 0a3h | 9dh  | 98h  |
| 25  | 0bbh | 0b5h | 9bh  | 0aah | 0a4h | 9fh  | 99h  |
| 30  | 0bdh | 0b7h | 9dh  | 0ach | 0a6h | 0a1h | 9bh  |
| 35  | 0beh | 0b9h | 9eh  | 0aeh | 0a8h | 0a2h | 9dh  |
| 40  | 0c0h | 0bbh | 9fh  | 0afh | 0aah | 0a4h | 9eh  |
| 45  | 0c2h | 0bch | 0a1h | 0b1h | 0abh | 0a6h | 0a0h |
| 50  | 0c4h | 0beh | 0a2h | 0b3h | 0adh | 0a7h | 0a2h |
| 55  | 0c6h | 0c0h | 0a3h | 0b5h | 0afh | 0a9h | 0a3h |
| 60  | 0c7h | 0c2h | 0a5h | 0b6h | 0b1h | 0abh | 0a5h |
| 65  | 0c9h | 0c4h | 0a6h | 0b8h | 0b2h | 0adh | 0a7h |
| 70  | 0cbh | 0c5h | 0a7h | 0bah | 0b4h | 0aeh | 0a8h |
| 75  | 0cdh | 0c7h | 0a9h | 0bch | 0b6h | 0b0h | 0aah |
| 80  | 0cfh | 0c9h | 0aah | 0bdh | 0b7h | 0b2h | 0ach |
| 85  | 0d1h | 0cbh | 0abh | 0bfh | 0b9h | 0b3h | 0aeh |
| 90  | 0d2h | 0cch | 0adh | 0c1h | 0bbh | 0b5h | 0afh |
| 95  | 0d4h | 0ceh | 0aeh | 0c3h | 0bdh | 0b7h | 0b1h |
| 100 | 0d6h | 0d0h | 0afh | 0c4h | 0beh | 0b8h | 0b3h |

FIG. 8  FAN ON HIGH SPEED $i,5 =$

| 5 | 10 | 15 | 20 | 25 | 30 | 35 | 40 | 45 | 50 | 55 | 60 | 65 | 70 | 75 | 80 | 85 | 90 | 95 | 100 |

$A(5,fh_i) =$

| 0c3h | 0c5h | 0c8h | 0cah | 0cch | 0ceh | 0d0h | 0d3h | 0d5h | 0d7h | 0d9h | 0dbh | 0ddh | 0e0h | 0e2h | 0e4h | 0e6h | 0e8h | 0ebh | 0edh |

$A(10,fh_i) =$

| 0beh | 0c0h | 0c2h | 0c4h | 0c6h | 0c8h | 0cbh | 0cdh | 0cfh | 0d1h | 0d3h | 0d5h | 0d8h | 0dah | 0dch | 0deh | 0e0h | 0e2h | 0e5h | 0e7h |

$A(15,fh_i) =$

| 0b8h | 0bah | 0bch | 0beh | 0c0h | 0c3h | 0c5h | 0c7h | 0c9h | 0cbh | 0cdh | 0cfh | 0d2h | 0d4h | 0d6h | 0d8h | 0dah | 0dch | 0deh | 0e1h |

$A(20,fh_i) =$

| 0b2h | 0b4h | 0b6h | 0b9h | 0bbh | 0bdh | 0bfh | 0c1h | 0c3h | 0c5h | 0c7h | 0c9h | 0cch | 0ceh | 0d0h | 0d2h | 0d4h | 0d6h | 0d8h | 0dah |

$A(25,fh_i) =$

| 0ach | 0afh | 0b1h | 0b3h | 0b5h | 0b7h | 0b9h | 0bbh | 0bdh | 0bfh | 0c1h | 0c4h | 0c6h | 0c8h | 0cah | 0cch | 0ceh | 0d0h | 0d2h | 0d4h |

$A(30,fh_i) =$

| 0a7h | 0a9h | 0abh | 0adh | 0afh | 0b1h | 0b3h | 0b5h | 0b7h | 0b9h | 0bbh | 0beh | 0c0h | 0c2h | 0c4h | 0c6h | 0c8h | 0cah | 0cch | 0ceh |

$A(35,fh_i) =$

| 0a1h | 0a3h | 0a5h | 0a7h | 0a9h | 0abh | 0adh | 0afh | 0b1h | 0b4h | 0b6h | 0b8h | 0bah | 0bch | 0beh | 0c0h | 0c2h | 0c4h | 0c6h | 0c8h |

FILTER MONITORING SYSTEM USING A THERMISTOR

This application claims priority to U.S. Provisional Application No. 60/176,354 filed on Jan. 14, 2000, which is incorporated herein by reference.

BACKGROUND OF THE INVENTION

1. Field of the Invention

The present invention relates generally to a filter monitoring system for filter-fan products and more particularly relates to a filter monitoring system using a thermistor that monitors the airflow through the product to determine ultimately when a filter requires replacement. The system can also provide an indication of percentage of filter life remaining.

2. Brief Description of the Prior Art

Filter-fan products such as some types of portable fans, air purifiers, humidifiers and dehumidifiers include filters for removing airborne particles from the homes or offices in which they operate. Such filters include fine particle high efficiency particulate air (HEPA) filters, filters for trapping relatively large particles and carbon filters to remove odors. Typically, a fan is positioned adjacent a removable filter to force air through the filter thereby trapping airborne particles therein.

Figure 1:
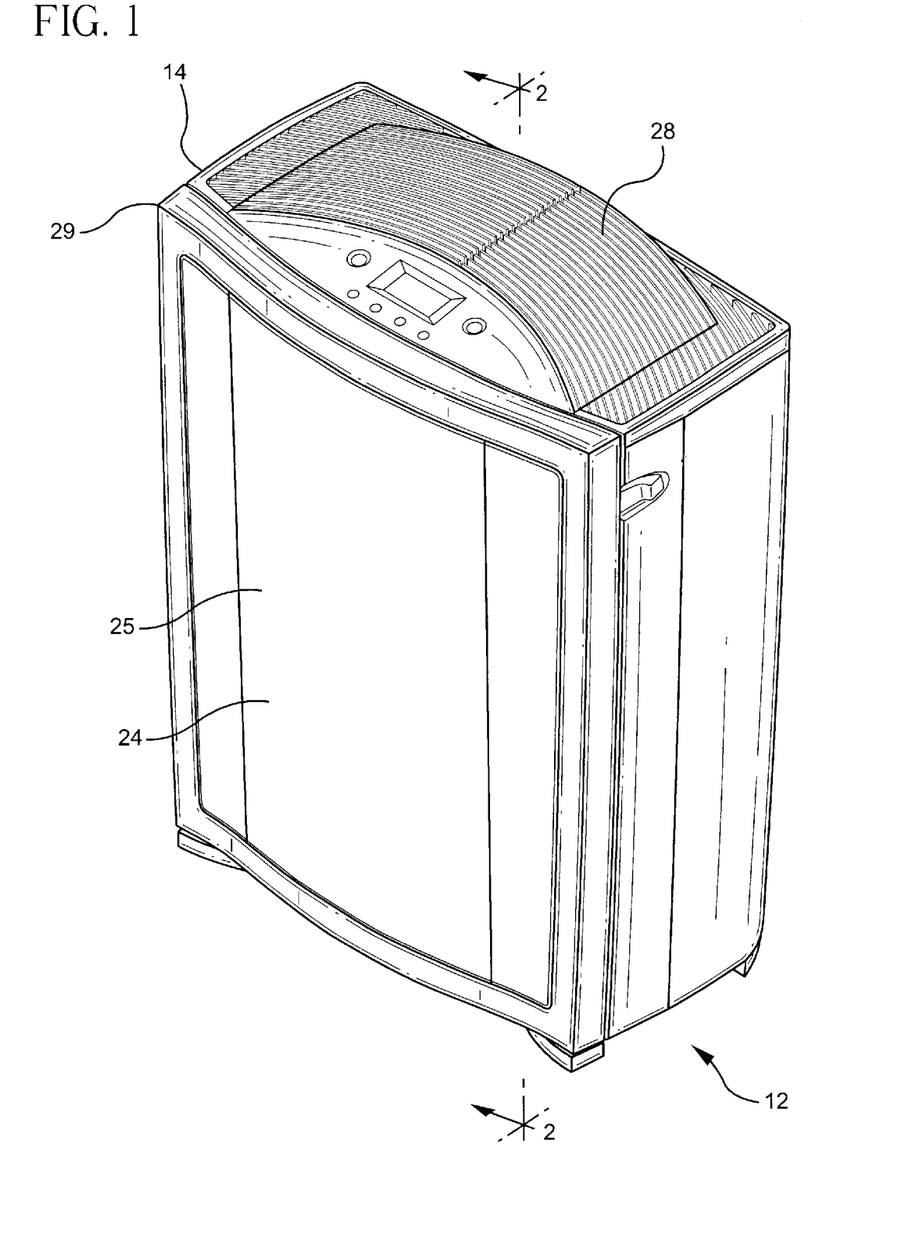
FIG. 1 is a front perspective view of a new filter-fan device that includes the present invention.
Figure 2:
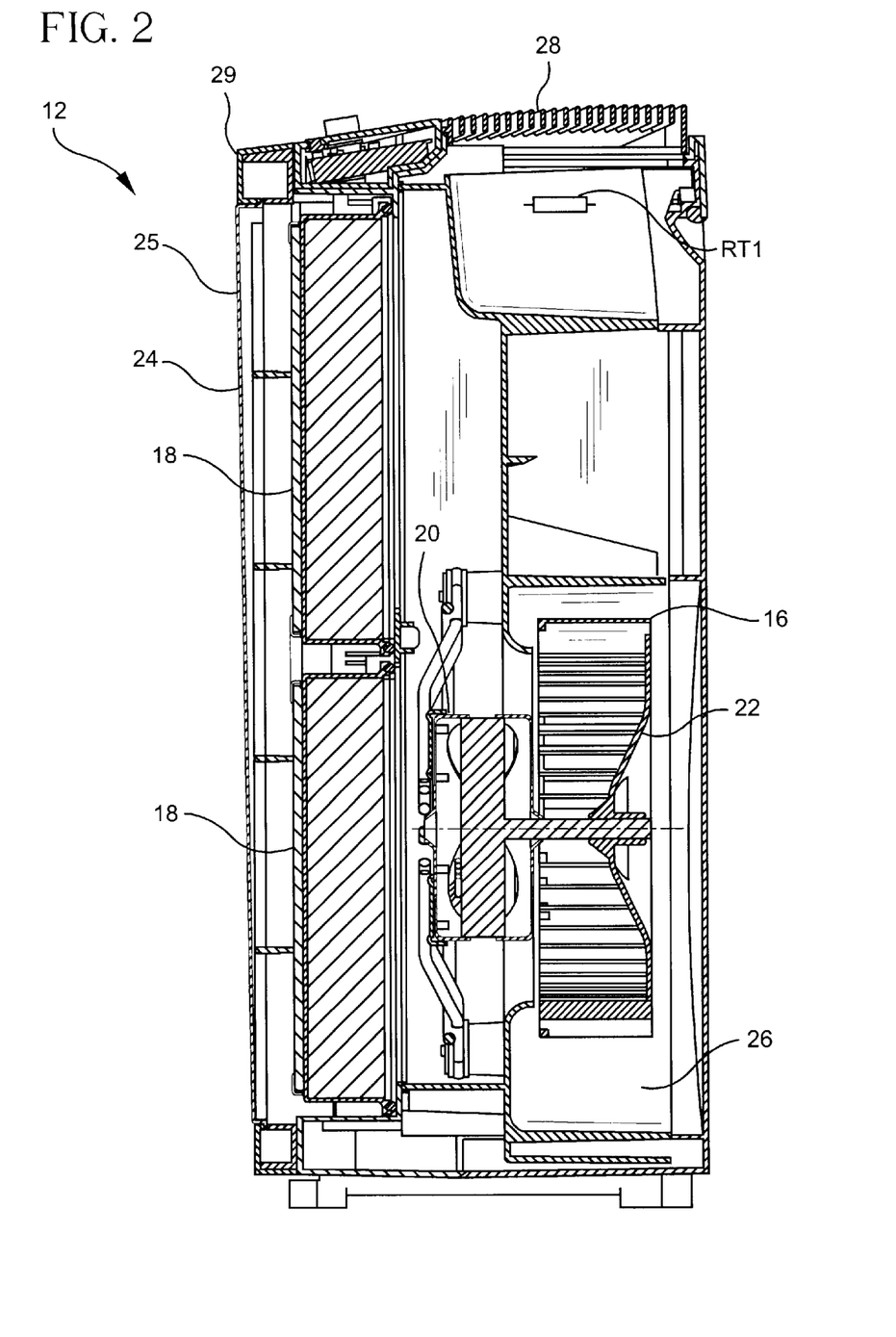
FIG. 2 is a cross-sectional view taken along line 2—2 as shown in FIG. 1.

FIG. 2 illustrates a cross section through new a filter-fan device 12 that includes a housing 14, a fan 16, and a filter assembly 18. The fan 16 has a motor 20 and a fan blade 22. In operation, the rotation of the fan blade 22 causes air to be drawn into the air inlet 24 through the filter assembly 18. The filtered air then moves through to enter the fan 16. The fan 16 expels the air into a scroll 26 which then exits through the air outlet 28. This illustrates the basic operation of the filter-fan device 12 that uses replaceable filter assemblies 18. The air inlet 24 is preferably formed as a perforated grill in a door of the filter-fan device 12.

As the efficiency of these type of products depends upon the replacement of he filter when spent, the ability to easily determine when the filter is spent is important. Accordingly, it is desirable to provide such fan-filter products with a system to monitor the remaining life of a filter and to indicate when the filter should be replaced.

U.S. Pat. No. 4,050,291 to Nelson discloses a filter condition responsive apparatus for a stove vent system. The stove vent system consists of a duct having two filters located in series with a fan for creating the airflow. The patent indicates that the filters have similar pressure drop characteristics although the first filter is designed to collect grease and the second filter is a charcoal filter for removing odors. The filter condition responsive device includes a first bypass containing a thermistor which is constantly heated by an electrical heater. The bypass is essentially a small duct connected to the duct of the stove vent system with an inlet on one side of the grease filter and the outlet on the other side of the grease filter. The electrical heater appears to be a separate resistor that generates heat. A second bypass is included across the charcoal filter along with a thermistor which is also constantly heated by an electrical heater. The thermistors are electrically coupled and are connected to an amplifier which in turn is connected to a filter condition indicator. When the grease filter becomes clogged, the bypass flow rates through bypasses are different. This difference is measured by a bridge network circuit and indicated on the filter condition indicator.

U.S. Pat. No. 5,014,908 to Cox discloses a control circuit for use in a humidifier. The patent discloses using a pair of thermistors for checking the condition of a wick in a humidifier. The filter check includes a first thermistor TRM1 located adjacent to the air inlet before the wick W and a second thermistor TRM2 located adjacent to the air outlet AO. When the humidifier is operating properly with a good wick, the air absorbs water from the wick causing the temperature to drop. The control circuit compares the air temperatures at the air inlet and air outlet through the thermistors and provides an indication to replace the filter when there is not a substantial difference.

U.S. Pat. No. 5,429,649 to Robin discloses a device for the detection of the clogging of an air filter. The device includes first and second sensing means, an auxiliary air duct, and an electronic circuit. The first and second sensing means are thermistors. The first sensing means is located in the air duct for measuring the air flow velocity in proximity to the air filter. The second sensing means is located in the auxiliary air duct and measures the air flow velocity therein. The electronic circuit compares the velocities measured by the sensing means to determine whether the air filter is clogged.

U.S. Pat. No. 5,668,535 to Hendrix et al. discloses a filter condition sensor and indicator that includes a heated thermistor located in a "small-by-pass air flow path" and a circuit having an indicator light. The device experiences an increase in air velocity through the "small by-pass air flow path" due to clogging of the filter. The indicator light is illuminated when the thermistor is cooled to a predetermined value. The device includes means for adjusting the current through the thermistor depending upon the setting of a multi-speed fan. The patent discloses two embodiments of the "small by-pass air flow path". In both embodiments the by-pass is "connected to the output air flow path separate from the filter." (See Column 3, Lines 43–45). That is, the air that flows by the thermistor is not filtered by the filter. The first embodiment is a separate compartment and the second embodiment is an extension through the filter.

SUMMARY OF THE INVENTION

The present invention is a method and apparatus for monitoring a percentage of filter life remaining of a filter assembly of filter-fan device. The filter-fan device generally include a fan that generates an airflow that passes through the filter assembly and exits through an air outlet. The invention uses a single thermistor that is operated in two separate modes for monitoring the filter assembly.

The method of operating the thermistor within a filter-fan device to monitor a percentage of filter life remaining of a filter assembly includes positioning the thermistor in the airflow within the filter-fan adjacent to the air outlet. A first current is applied to the thermistor for determining the temperature of the airflow from a first thermistor voltage. The first thermistor voltage is responsive to the first current applied to the thermistor. A second current that is greater than the first current is applied to heat the thermistor. The temperature of the thermistor is determined from a second thermistor voltage which is responsive to the second current applied to the thermistor. The percentage of filter life remaining of the filter assembly is determined from the temperature of the airflow and the second thermistor voltage. Preferably an indication of the percentage of filter life remaining of the filter assembly is provided on a visual display. Preferably the thermistor is positioned about 3 inches from the air outlet of the filter-fan.

The system for monitoring the percentage of filter life remaining of a filter assembly in accordance with the present invention includes a thermistor and a controller. The thermistor is positioned in the airflow within the filter-fan adjacent to the air outlet. The controller is configured to operate the thermistor as noted above in connection with the method of the invention. Preferably the controller includes a microprocessor having a first look-up table and a second look-up table. The first look-up table correlates the first thermistor voltage with the temperature of the airflow. The second look up table correlates the temperature of the airflow and the second thermistor voltage with the percentage of filter life remaining of the filter assembly. Preferably the system includes a display for providing a visual indication of the percentage of filter life remaining. Preferably the controller is configured to account for different line voltages to the filter-fan.

In an alternative embodiment where the filter-fan includes a multiple speed fan, the controller is.configured to determine the percentage of filter life remaining of the filter assembly from the temperature of the airflow, the second thermistor voltage and the speed of the fan. Preferably the controller includes a microprocessor that has a plurality of second look-up tables with at least one second.look-up table being associated with each fan speed.

As a result of the present invention ,a method and apparatus for monitoring a percentage of filter life remaining of a filter assembly is provided that uses a single thermistor. The thermistor is located in an airflow of filtered air and is not located in a separate bypass duct.

DETAILED DESCRIPTION OF THE PREFERRED EMBODIMENTS

In accordance with the present invention the filter monitoring system is generally included in a control circuit 10 that controls the operation of a filter-fan device 12 and monitors the amount of air flowing to determine the degree to which the filter assembly is clogged. Since the airflow depends on the speed of the fan 16 as well as the degree to which the filter is clogged, the control circuit 10 preferably adjusts for the speed of the fan 16.

Figure 3:
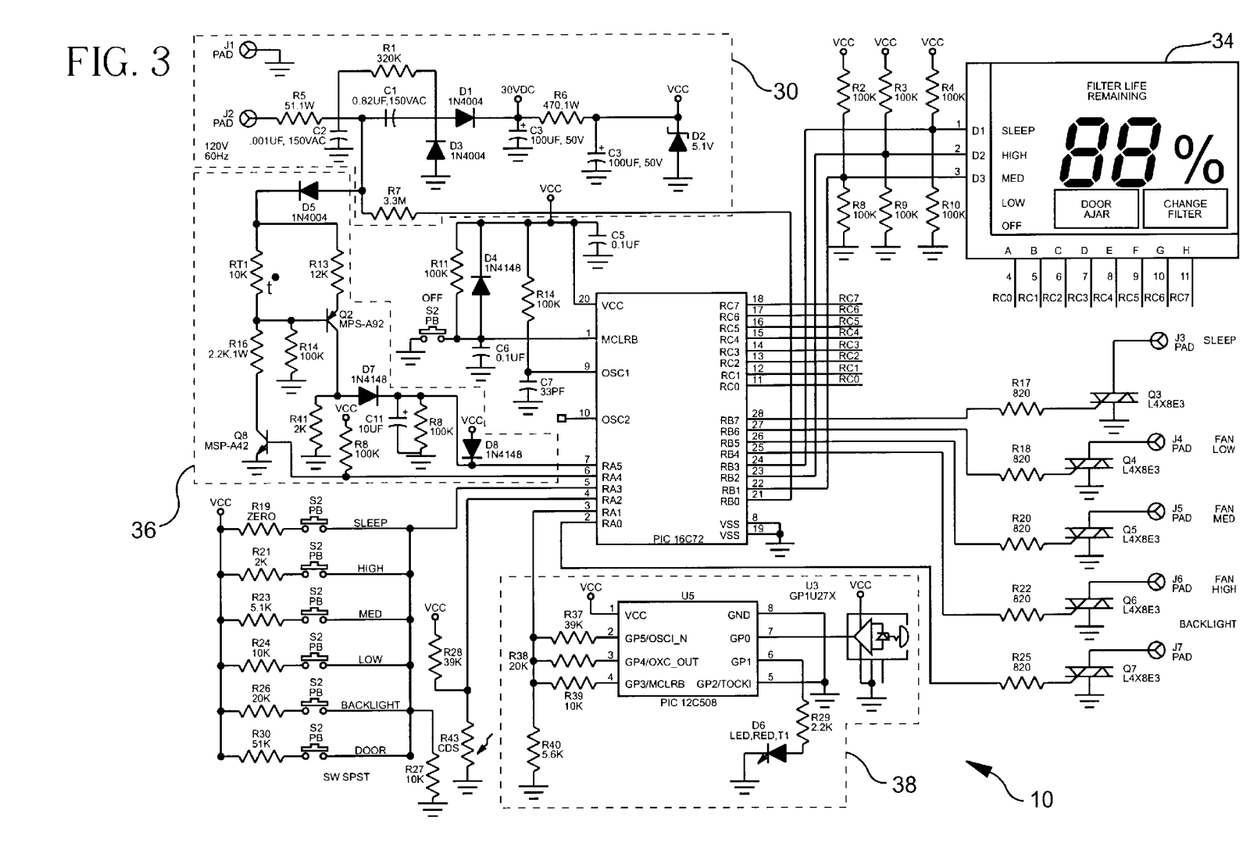
FIG. 3 is a diagram of a control circuit in accordance with the present invention.

Referring now to FIG. 3, the control circuit 10 preferably includes a power supply 30, a microprocessor 32, a liquid crystal display (LCD) 34, pushbutton control switches S1 through S7, triac drivers Q3 through Q7, and an airflow monitoring circuit 36. Preferably the control circuit 10 also includes an infrared remote control receiver 38. The control circuit 10 shown in FIG. 3 is generally incorporated into the filter-fan circuitry as shown in the block diagram shown in FIG. 4.

The power supply 30 uses the reactance of capacitor C1 to drop the voltage to a low level. Preferably a capacitor is used instead of a resistor to limit the amount of heat generated by the circuit 10. Resistor R5 limits the surge current that flows when AC power is applied and the AC waveform is at a high value. Zener diode D2 regulates the power supply voltage to a nominal 5.1 VDC.

The microprocessor 32 is preferably a Microchip PIC16C72 with digital inputs and outputs plus four analog to digital converter (ADC) inputs, RA1, RA2, RA3 and RA5. Resistor R12 and capacitor C7 set the internal clock oscillator frequency and diode D4, resistor R11 and capacitor C6 insure the microprocessor 32 is reset when power is removed and reapplied. Pressing switch Si also resets the microprocessor 32 to turn off all power to the triacs and the LCD 34.

The LCD 34 has two seven segment digits that display the percentage of filter life remaining, SLEEP, HIGH, MED, LOW and OFF to indicate the speed of the fan 16, DOOR AJAR to indicate when the door 29 has not been properly closed, and CHANGE FILTER to indicate when the filter assembly 18 has become clogged. FILTER LIFE REMAINING and % are turned on whenever the fan 16 is running. The display 34 is driven by the microprocessor 32 using resistors R2, R3, R4, R8, R9 and R1O and ports RCO to RC7 as segment drivers and RB1 to RB3 as backplane drivers. The LCD 34 is backlit by an electroluminescent panel. The light is turned on only in darkness using a cadmium sulfide sensor R43 to sense light level. A triac Q7 controls application of 120VAC power to the panel.

Fan speed switches S2 through S5 are monitored by the microprocessor 32 which controls the speed of the fan 16 by turning on triacs Q3 through Q6. Switch S6 turns the LCD backlight off and on when the light level is low. In high light levels, the backlight is turned off by a signal from the cadmium sulfide sensor R43. The voltage at the junction of resistor R28 and cadmium sulfide sensor R43 is monitored by the microprocessor 32 which only applies power to the LCD backlight when the light level is low. Switch S6 overrides the operation of the cadmium sulfide sensor R43 so the backlight can be turned off even at night. Switch S7 is a microswitch that is open when the filter assembly compartment door 29 is not properly closed. The microprocessor 32 monitors the voltage at ADC input RA3. The voltage at ADC input RA3 indicates which switch is pressed because the resistor values R19, R21, R23, R24, R26 and R30 are different.

Figure 4:
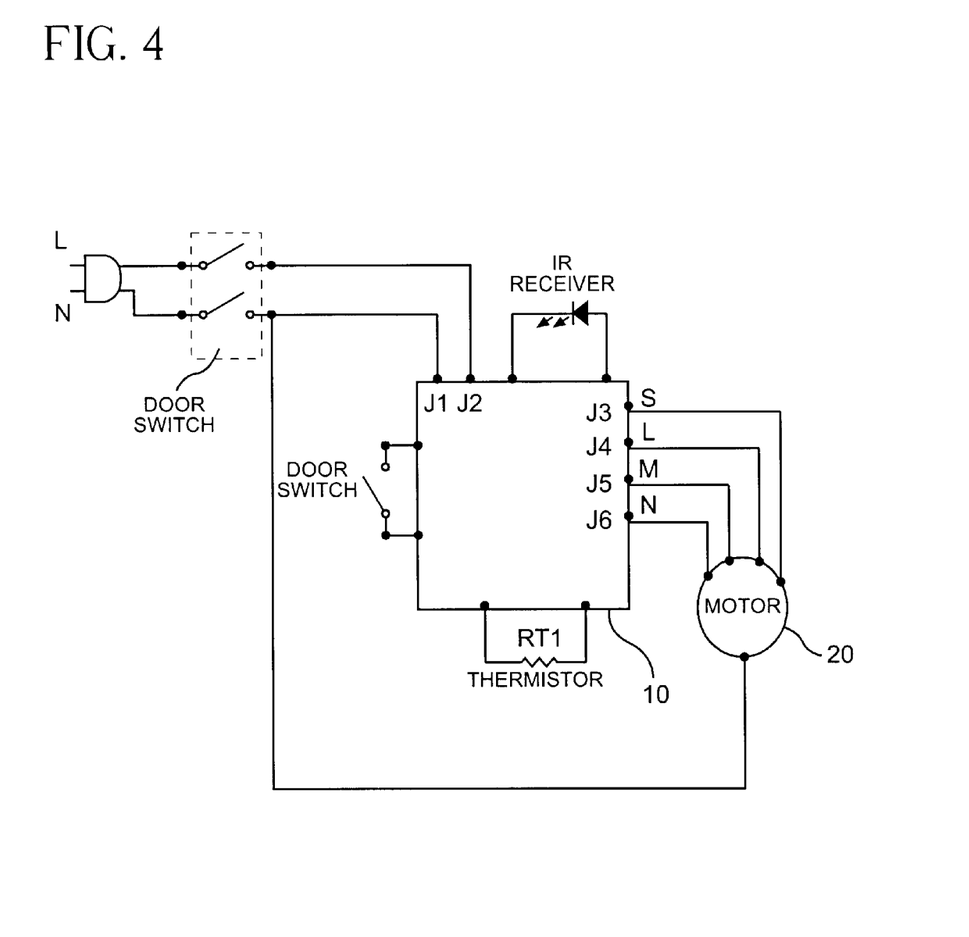
FIG. 4 is a block diagram for a filter-fan circuit that includes the present invention.

When the microprocessor 32 senses that a switch S2 through S6 has been pushed, it applies a high voltage to the resistor that is connected to the gate of the corresponding triac Q3 through Q7. The triac then allows current to flow from one side of the motor 20 of the fan 16 to ground. The other side of the motor 20 is tied to the high side of the AC line in the unit wiring as shown in FIG. 4.

Figure 5:
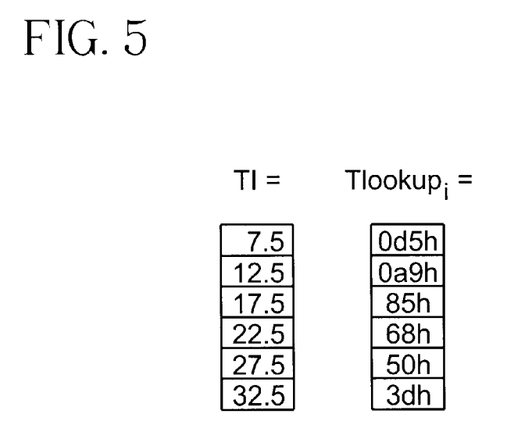
FIG. 5 is a first look-up table for use by the airflow monitoring circuit in the first mode.

The airflow monitoring circuit 36 operates in two modes depending on the voltage the microprocessor 32 applies to the base of Q8 from RA4. When RA4 is low, Q8 is turned off and the amount of current flowing through thermistor RT1 is determined by the voltage on the cathode of diode D5 and the value of resistor R14. The thermistor RT1 is located within the airflow inside the filter-fan device 12 as shown in FIG. 2. Preferably the thermistor RT1 is located centrally and inside of the air outlet grill 28, and most preferably about 3 inches below the grill 28. Referring now to FIG. 3, the voltage at the junction of thermistor RT1 and resistor R14 is a measure of the resistance of thermistor RT1, and therefore the temperature of thermistor RT1. Transistor Q2, resistor R13 and resistor R41 convert the voltage to a value suitable for application to the microprocessor 32 ADC input RA5. Diode D7, capacitor C11 and resistor R42 rectify the voltage appearing on the collector of transistor Q2 and apply it to ADC input RA5. The microprocessor 32 then reads the voltage and uses a first look-up table to determine the temperature of the air passing over thermistor RT1. A representative example of a first look-up table calibrated for use in the present invention is shown in FIG. 5. In the first look-up table, T1 is temperature in degree Celsius and Tlookup is the hexadecimal value used by the microprocessor 32 to determine temperature. If the hexadecimal value read from the thermistor RT1 with low (non-self heating) current is less than d5h, the temperature is assumed to be 5 degree Celsius. If the value is between d5h and a9h, the temperature is assumed to be 10 degree Celsius, etc. The temperature values are used in connection with a second look-up table in the second mode as described below.

Figure 6:
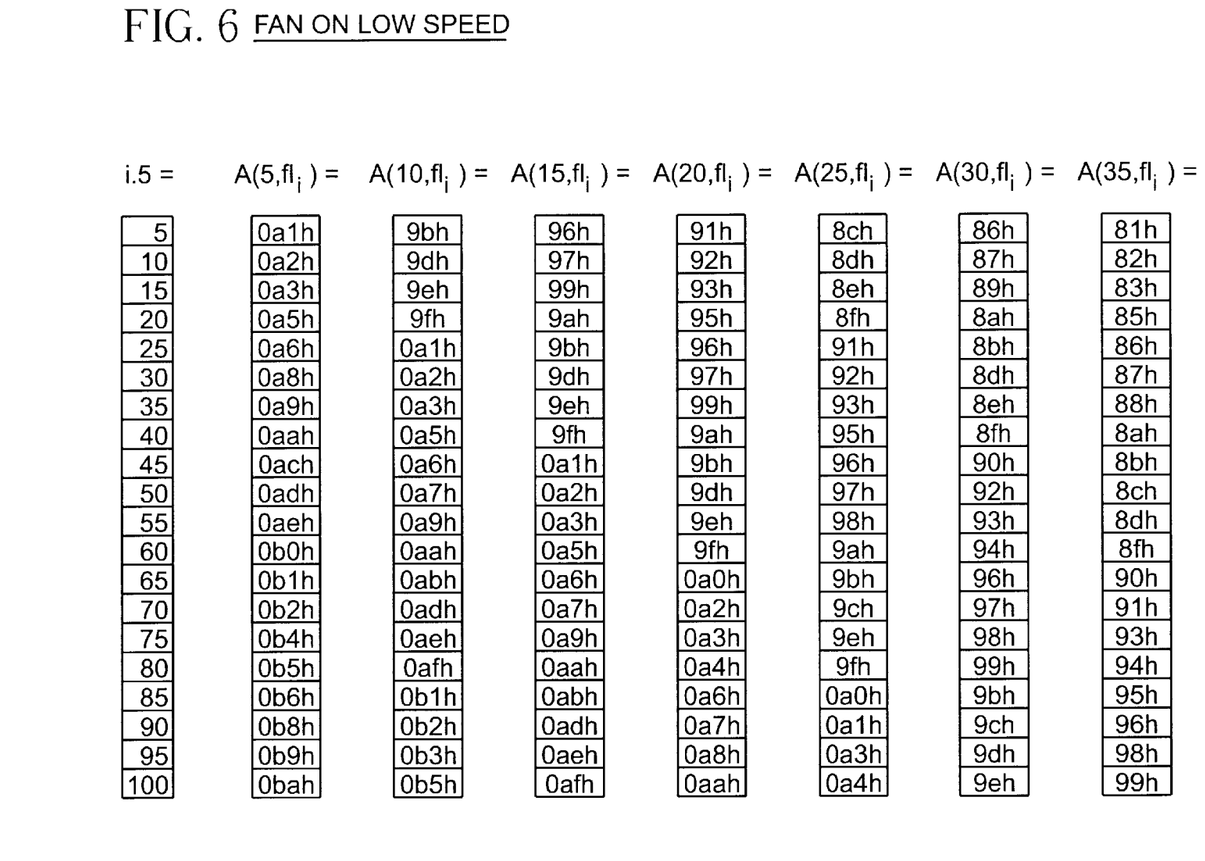
FIG. 6 is a second look-up table for use by the airflow monitoring circuit in the second mode with the fan set on a low speed.
Figure 7:
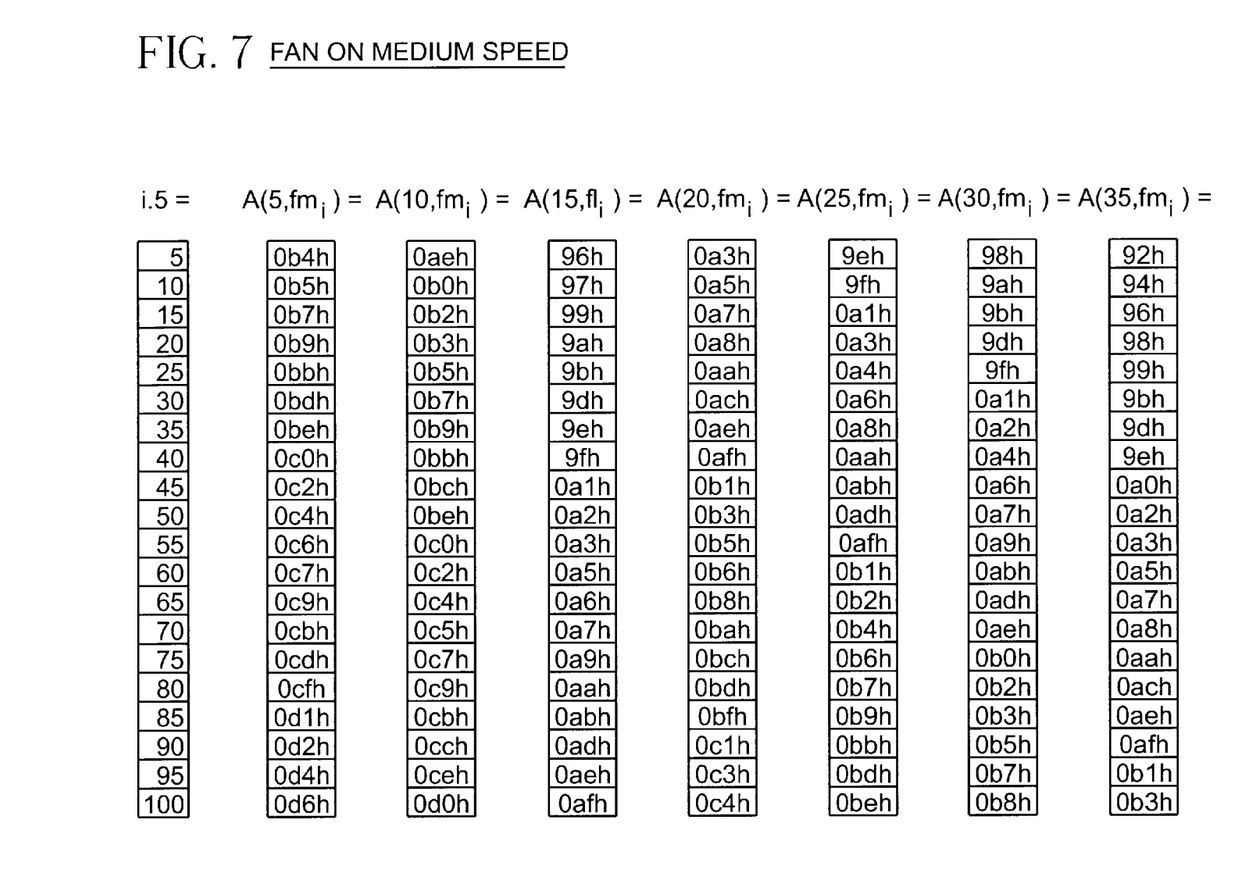
FIG. 7 is a second look-up table for use by the airflow monitoring circuit in the second mode with the fan set on a medium speed.
Figure 8:
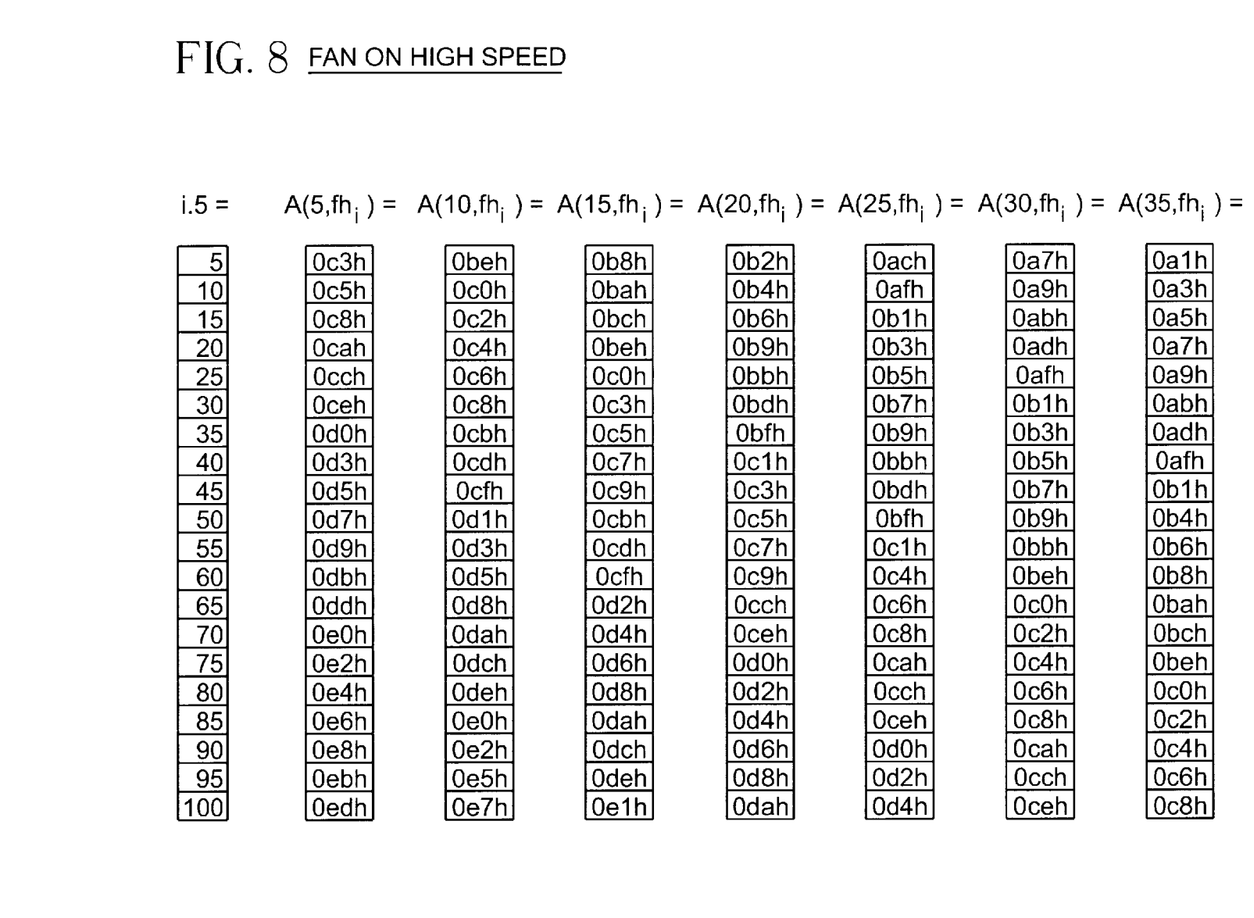
FIG. 8 is a second look-up table for use by the airflow monitoring circuit in the second mode with the fan set on a high speed.

In the second mode, the airflow monitoring circuit 36 has Q8 turned on causing more current to pass through thermistor RT1 and resistor R16 causing the temperature of thermistor RT1 to increase. In still air, the temperature increases to 130 to 150 degree Celsius. Moving air cools thermistor RT1 and increases its resistance causing the voltage on ADC input RA5 to decrease. The speed of the air is related to the amount of cooling and therefore the voltage on ADC input RA5. The amount of cooling of thermistor RT1 is also related to the ambient temperature of the air. Using the reading of ambient temperature taken in mode 1 and the current fan speed, the microprocessor uses a second look-up table and finds a value that it sends to the LCD 34. Examples of the second look-up table calibrated for use at specific fan speeds in the present invention are shown in FIGS. 6 through 8. The second look-up tables include readings of the analog to digital converter input to the microprocessor 32 expressed in hexadecimal format. The hexadecimal readings represent the voltage on ADC input RA5, and therefore the temperature of RT1. The values in the left column of each look-up table represent percentage filter life remaining. The remaining columns contain the look-up values for an ambient temperature between the range of 5 degree Celsius to 35 degree Celsius. For example, if the fan speed is set to low, the ambient temperature is 20 degree Celsius and the analog to digital converter reading is 97 h, the filter life remaining is 30% as shown in FIG. 6. Preferably the microprocessor is configured to account for differences in the line voltage as this will affect the fan speed. Preferably the value displayed on the LCD 34 is the percentage of filter life remaining. A value of 50% airflow reduction was assumed for 0% filter life remaining. When this value is reached, The CHANGE FILTER icon is also turned on in the LCD 34.

Preferably the control circuit 10 also includes an infrared remote control receiver 38. The receiver 38 allows the consumer to remotely control the fan speed of the filter-fan device 12. The remote control receiver 38 preferably includes a device U3 that receives the infrared remote signal and converts it to a logic level. The logic level data stream enters GPO of US and is decoded, checked for errors and sets a pattern of logic levels on GP3 to GP5. GP3 to GP5 are tied to resistors and along with resistor R40, present a unique voltage to ADC input RA1 of the microprocessor 32. Depending on the voltage level, microprocessor 32 either does nothing or changes fan speed.

Although illustrative embodiments of the present invention have been described herein with reference to the accompanying drawings, it is to be understood that the invention is not limited to those precise embodiments, and that various other changes and modifications may be effected by one skilled in the art without departing from the scope or spirit of the invention.

What is claimed is:

1. A method of operating a thermistor within a filter-fan device to monitor a percentage of filter life remaining of a filter assembly, the filter-fan device having a fan that generates an airflow that passes through the filter assembly and exits through an air outlet, the airflow having a temperature, said method comprising the steps of:
   (a) positioning the thermistor in the airflow within the filter-fan adjacent to the air outlet;
   (b) applying a first current to the thermistor;
   (c) determining the temperature of the airflow from a first thermistor voltage, the first thermistor voltage being responsive to the first current applied to the thermistor;
   (d) applying a second current to the thermistor to heat the thermistor, the second current being greater than the first current;
   (e) determining the temperature of the thermistor from a second thermistor voltage, the second thermistor voltage being responsive to the second current applied to the thermistor; and
   (f) determining the percentage of filter life remaining of the filter assembly from the temperature of the airflow and the second thermistor voltage.

2. A method of operating a thermistor according to claim 1, further comprising the steps of:
   (g) providing an indication of the percentage of filter life remaining of the filter assembly.

3. A method of operating a thermistor according to claim 2, wherein said indication is visually displayed.

4. A filter monitoring system for a filter-fan for monitoring a percentage of filter life remaining of a filter assembly, the filter-fan device having a fan that generates an airflow that passes through the filter assembly and exits through an air outlet, the airflow having a temperature, said filter monitoring system comprising:
   a thermistor positioned in the airflow within the filter-fan adjacent to the air outlet;
   a controller, the controller:
      (a) applying a first current to the thermistor;
      (b) determining the temperature of the airflow from a first thermistor voltage, the first thermistor voltage being responsive to the first current applied to the thermistor;
      (c) applying a second current to the thermistor to heat the thermistor, the second current being greater than the first current;
      (d) determining the temperature of the thermistor from a second thermistor voltage, the second thermistor voltage being responsive to the second current applied to the thermistor; and
      (e) determining the percentage of filter life remaining of the filter assembly from the temperature of the airflow and the second thermistor voltage.

5. A filter monitoring system according to claim 4, wherein said controller includes a microprocessor having:

a first look-up table correlating the first thermistor voltage with the temperature of the airflow; and a second look-up table correlating the temperature of the airflow and the second thermistor voltage with the percentage of filter life remaining.

6. A filter monitoring system according to claim 4, further comprising a display for providing a visual indication of the percentage of filter life remaining.

7. A filter monitoring system according to claim 4, wherein the controller is configured to account for different line voltages to the filter-fan.

8. A filter monitoring system according to claim 4, wherein the thermistor is positioned about 3 inches from the air outlet.

9. A filter monitoring system for a filter-fan for monitoring a percentage of filter life remaining of a filter assembly, the filter-fan device having a multiple speed fan that generates an airflow that passes through the filter assembly and exits through an air outlet, the airflow having a temperature, said filter monitoring system comprising:

a thermistor positioned in the airflow within the filter-fan adjacent to the air outlet;

a controller, the controller:
  (a) applying a first current to the thermistor;
  (b) determining the temperature of the airflow from a first thermistor voltage, the first thermistor voltage being responsive to the first current applied to the thermistor;
  (c) applying a second current to the thermistor to heat the thermistor, the second current being greater than the first current;
  (d) determining the temperature of the thermistor from a second thermistor voltage, the second thermistor voltage being responsive to the second current applied to the thermistor; and
  (e) determining the percentage of filter life remaining of the filter assembly from the temperature of the airflow, the second thermistor voltage and the speed of the fan.

10. A filter monitoring system according to claim 9, wherein said controller includes a microprocessor having:

a first look-up table correlating the first thermistor voltage with the temperature of the airflow; and a plurality of second look-up tables correlating the temperature of the airflow, the second thermistor voltage, and the speed of the fan with the percentage of filter life remaining of the filter assembly.

11. A filter monitoring system according to claim 9, further comprising a display for providing a visual indication of the percentage of filter life remaining.

12. A filter monitoring system according to claim 9, wherein the controller is configured to account for different line voltages to the filter-fan.

13. A filter monitoring system according to claim 9, wherein the thermistor is positioned about 3 inches from the air outlet.

\* \* \* \* \*

UNITED STATES PATENT AND TRADEMARK OFFICE
CERTIFICATE OF CORRECTION

PATENT NO. : 6,507,282 B1
DATED : January 14, 2003
INVENTOR(S) : Sherwood, Robert It is certified that error appears in the above-identified patent and that said Letters Patent is hereby corrected as shown below:

<u>Column 1,</u>
Line 39, now reads "replacement of he filter" should read -- replacement of the filter --

<u>Column 4,</u>
Line 19, now reads "Pressing switch Si" should read -- Pressing switch S1 --

<u>Column 5,</u>
Line 65, now reads "enters GPO of US" should read -- enter GP0 of U5 --

Signed and Sealed this

Second Day of September, 2003

JAMES E. ROGAN
*Director of the United States Patent and Trademark Office*